United States Patent [19]

Rieger et al.

[11] Patent Number: 4,571,934
[45] Date of Patent: Feb. 25, 1986

[54] CHAIN WITH CHAIN LINKS OF WELDED ROUND MATERIAL

[75] Inventors: Werner Rieger, Aalen-Unterkochen; Hans H. Dalferth, Aalen-Wasseralfingen; Franz Eberhardt, Aalen, all of Fed. Rep. of Germany

[73] Assignee: RUD-Kettenfabrik Rieger & Dietz GmbH u. Co., Aalen, Fed. Rep. of Germany

[21] Appl. No.: 461,238

[22] Filed: Jan. 26, 1983

[30] Foreign Application Priority Data

Feb. 5, 1982 [DE] Fed. Rep. of Germany ....... 3204287

[51] Int. Cl.$^4$ ............................................. F16G 13/06
[52] U.S. Cl. ............................................ 59/90; 59/84
[58] Field of Search ..................... 59/3, 5, 8, 78, 83, 59/84, 90; D8/499

[56] References Cited

U.S. PATENT DOCUMENTS

| 448,880 | 3/1891 | Hansen | 59/93 |
| 540,498 | 6/1895 | Klatte | 59/84 |
| 3,410,085 | 5/1964 | Sheth | 59/84 |
| 3,545,200 | 12/1970 | Fagen | 59/93 |
| 3,662,539 | 5/1972 | Florjancic | 59/84 |
| 3,775,969 | 12/1973 | Vasterling | 59/78 |

FOREIGN PATENT DOCUMENTS

| 199014 | 8/1958 | Austria . | |
| 550570 | 9/1956 | Belgium | 59/93 |
| 765566 | 9/1980 | U.S.S.R. | 59/78 |

Primary Examiner—Francis S. Husar
Assistant Examiner—David B. Jones
Attorney, Agent, or Firm—Mark P. Stone; F. Eugene Davis, IV

[57] ABSTRACT

In a chain with chain links of round material, the chain links have, in the region of their contact points, supporting arcs (7,8) with a supporting arc angle $\alpha$ of 180° and a radius of curvature $R_s$ of 0.5 to 0.52 d, d being the diameter of the round material. On the side of the unwelded leg (3) of the chain link, the supporting arcs (7,8) are connected by a boundary line (9) of the clear inner space (6) of the chain link, which boundary line has an arcuate indentation (11), while the supporting arcs on the side of the welded leg (4) of the chain link are connected by a substantially straight boundary line. The greatest inner width $b_{1max}$ of the chain link is at most equal to 1.15 times the diameter d of the round material.

12 Claims, 3 Drawing Figures

CHAIN WITH CHAIN LINKS OF WELDED ROUND MATERIAL

BACKGROUND OF THE INVENTION

The invention relates to a chain with chain links of a welded round material, in particular round steel, in which the noses of successive chain links have, in the region of their contact points and viewed in the central link plane, supporting arcs with a radius of curvature $R_s$ which is virtually equal to half the diameter d of the round material, and in which the chain links have, at least at one point, an inner width $b_1$ of the size of 1.1 times the diameter d of the round material.

Austrian Patent Specification No. 199,014 has disclosed a chain of the above type in which the supporting arc angle $\alpha$ is less than 180°, and preferably is 90°. In this chain, the supporting arcs of the chain links merge via transition radii into parallel legs, the mutual distance of which is comparatively large. For several reasons, the known chain is not fully satisfactory. The first reason is that the supporting arc angle is intended to be of the order of magnitude of 90°. This has the consequence that, when running over deflection wheels, in particular in the case of sharp angles between successive chain links, the support of the chain links in the region of the supporting arcs deteriorates, because the area available for force transmission decreases to an undesirably large extent. A further disadvantage of the known chain is the large inner width $b_1$ of its chain links and the symmetrical structure of the latter, which does not take account of the stress conditions in the chain links.

SUMMARY OF THE INVENTION

It is the object of the invention to provide a chain of the type under consideration, which is distinguished by low wear of the joints and by high strength, and which for this reason is particularly suitable for use as a chain in lifting-tackle.

According to the invention, this object is achieved when the radius of curvature $R_s$ extends over a supporting arc angle of 180° and the boundary line, connecting the supporting arcs on the side of at least one leg of the chain links, of the clear inner space of the chain links forms or has a arcuate indentation.

The chain according to the invention has joints with very good contact conditions between successive chain links, even when the chain runs over chain wheels. The risk of disadvantageous migration of the pivot point of the chain links when passing over chain wheels disappears due to the 180° supports; in other words, the pivot point moves in a kinematically perfect manner on a prescribed circular path. The arcuate indentation ensures free mobility of the chain links, even if the weld of a chain link following a preceding chain link comes to lie, in the relaxed state, in the link centre of the preceding chain link and consequently two welds are in immediate proximity; furthermore, it has the advantage that the bending stresses, which increase with increasing innner width $b_1$, occur only in the unwelded leg, that is to say, the leg, the strength of which can a priori be more highly stressed, whilst the bending stresses in the welded leg are kept small.

For fundamental strength considerations, the greatest inner width $b_{1max}$ of the chain links should be at most equal to 1.15 times the diameter d of the round material used for the manufacture of the chain links and the radius of curvature $R_s$ of the supporting arcs should not exceed 0.52 times this diameter d.

As illustrated in FIGS. 1 and 2, the pitch t of the chain link is the distance between the vertices of the supporting arcs 7 and 8 of the chain link. In the present invention, the pitch t of the chain link is 2.85 times the diameter d, which as noted above, is the diameter of the starting material for manufacture of the chain links. In the subject invention, the pitch t should not exceed three times the diameter d.

The described compact construction of the chain links, which according to the invention are deliberately designed asymmetrical, in contrast to known chain links, makes it possible to keep their outer width $b_2$ markedly smaller than was hitherto usual.

BRIEF DESCRIPTION OF THE DRAWINGS

Further details and features of the invention can be seen from the sub-claims and the attached drawing of preferred illustrative embodiments, wherein:

DESCRIPTION OF THE PREFERRED EMBODIMENTS

Figure 1:
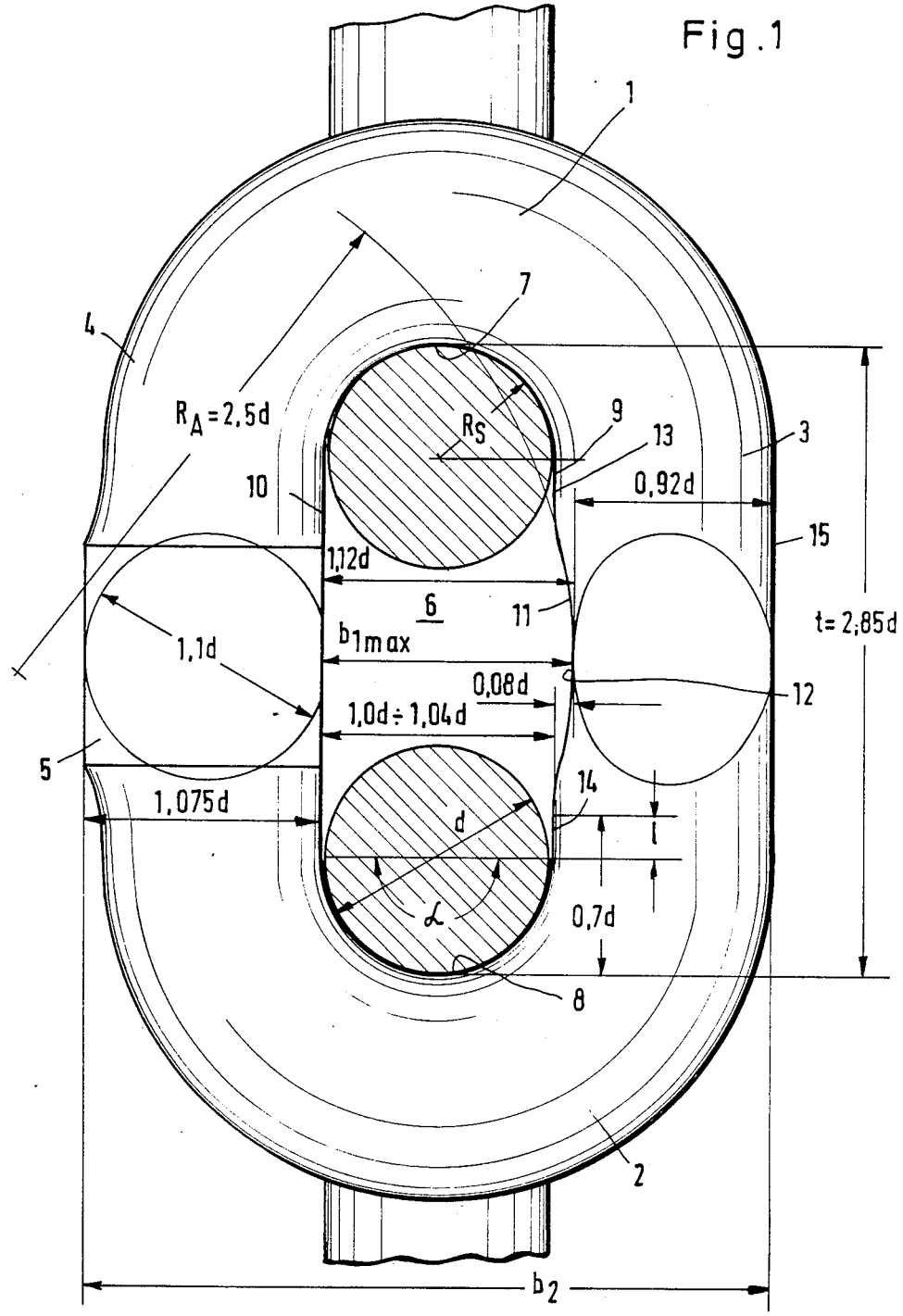
FIG. 1 shows a chain link of particularly advantageous design for a lifting-tackle chain.

The chain link shown in FIG. 1 is produced from round material having a starting diameter d. It has two noses 1 and 2 which are mutually joined by an unwelded leg 3 and a welded leg 4. The weld of the leg 4 is marked 5 in FIG. 1. 6 is the clear inner space of the chain link, into which two further chain links are hung in each case. The sides of the noses 1 and 2, bounding the inner space 6, form supporting arcs 7 and 8, the radius of curvature $R_s$ of which is preferably equal to 0.5 times the nominal diameter d of the starting material for the manufacture of the chain links. The supporting arcs 7 and 8 extend over a supporting arc angle of $\alpha = 180°$. Since the radius of curvature $R_s$ is virtually equal to half the diameter d of the round material, good contact conditions between the mutually joined chain links are obtained, even when the chain links pass over chain wheels and execute pivoting movements relative to one another.

The clear inner space 6 is bounded by boundary lines 9 and 10 and by the supporting arcs 7 and 8. The boundary line 9, connecting the supporting arcs on the side of the unwelded leg 3 with one another, is provided with a arcuate indentation 11. The bulge 11 has the shape of a depression and the clear inner space 6 of the chain link has, in the region of the vertex 12 of the arcuate indentation 11, its greatest inner width $b_{1max}$ which, in the case shown, is equal to 1.12 times the diameter d of the round material. To keep the outer width $b_2$ of the chain link small, the leg 3 is pressed flat in the region of the arcuate indentation, without the cross-section, indicated by a hatched oval, being reduced.

The profile of the arcuate indentation 11 is circular, the radius of curvature $R_4$ being approximately 2.5 times the diameter d of the round material.

The leg 4 is slightly reinforced in the region of the weld 5. However, the reinforcement does not extend into the clear inner space 6 of the chain link. Jamming of chain links need therefore not be feared.

In the case shown, the arcuate indentation 11 does not directly adjoin the supporting arcs 7 and 8. Rather, that part of the boundary lines which forms the arcuate indentation 11 merges via straight boundary line sections 13 and 14 into the supporting arcs 7 and 8. The length l of the boundary line sections is about 0.2 times the diameter d of the round material which is used for the manufacture of the chain link.

Figure 2:
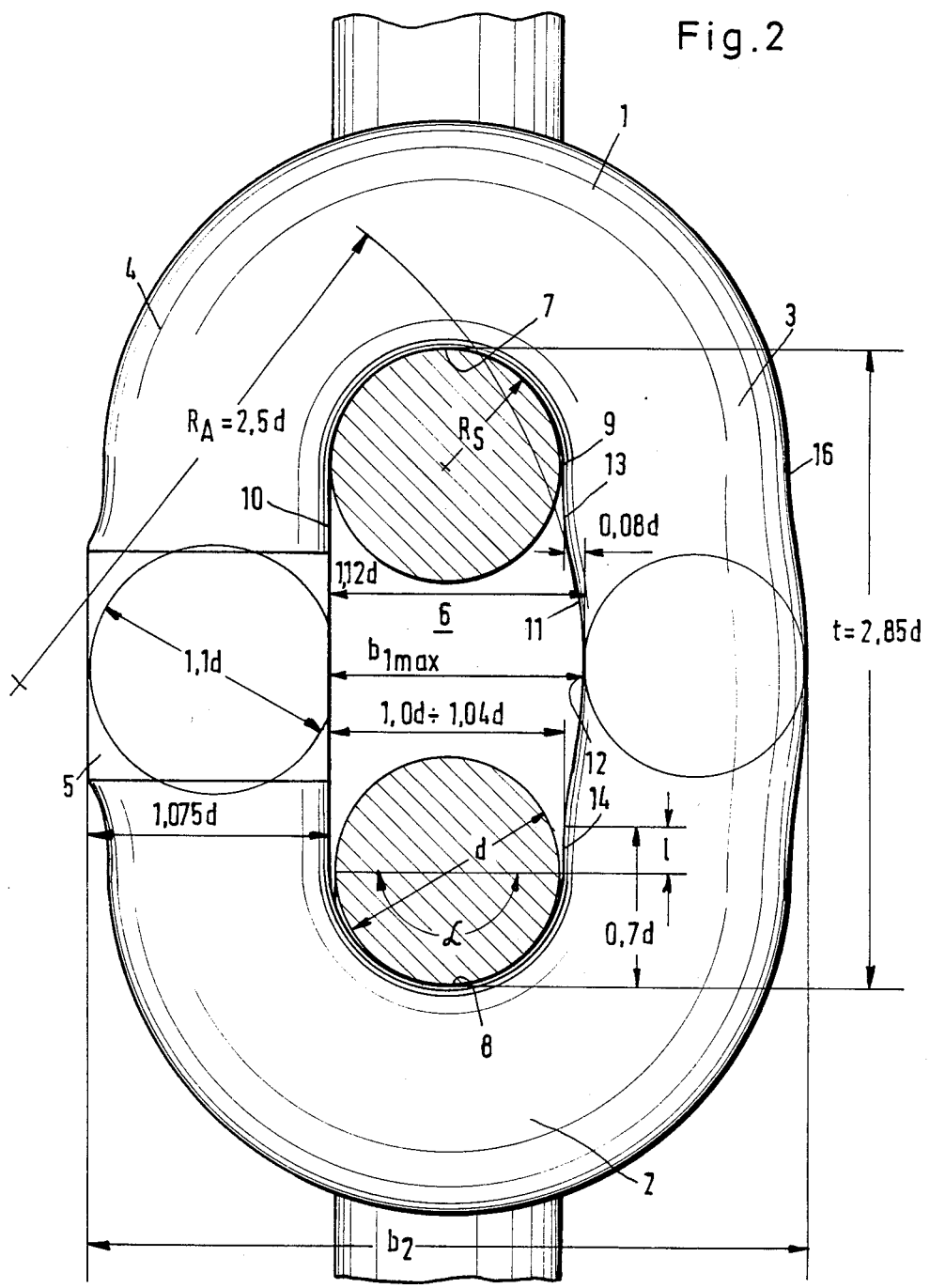
FIG. 2 shows a further chain link of a lifting-tackle chain.

Whilst the outer boundary line 15 of the unwelded leg in the region of the arcuate indentation 11 is straight in the chain link according to FIG. 1, the outer boundary line 16 of the chain link according to FIG. 2 is slightly domed outwards in the region of the arcuate indentation 11, and indeed preserves the original cross-section, indicated by a hatched circle of the round material which is used for the manufacture of the chain link.

In other respects, the structure of the chain link according to FIG. 2 corresponds largely to the structure of the chain link according to FIG. 1. The same reference symbols as in FIG. 1 were therefore used for marking the individual components of the second chain link. A separate description of the chain link according to FIG. 2 is therefore unnecessary, in view of the extensive similarity between the two chain links shown, as mentioned.

Figure 3:
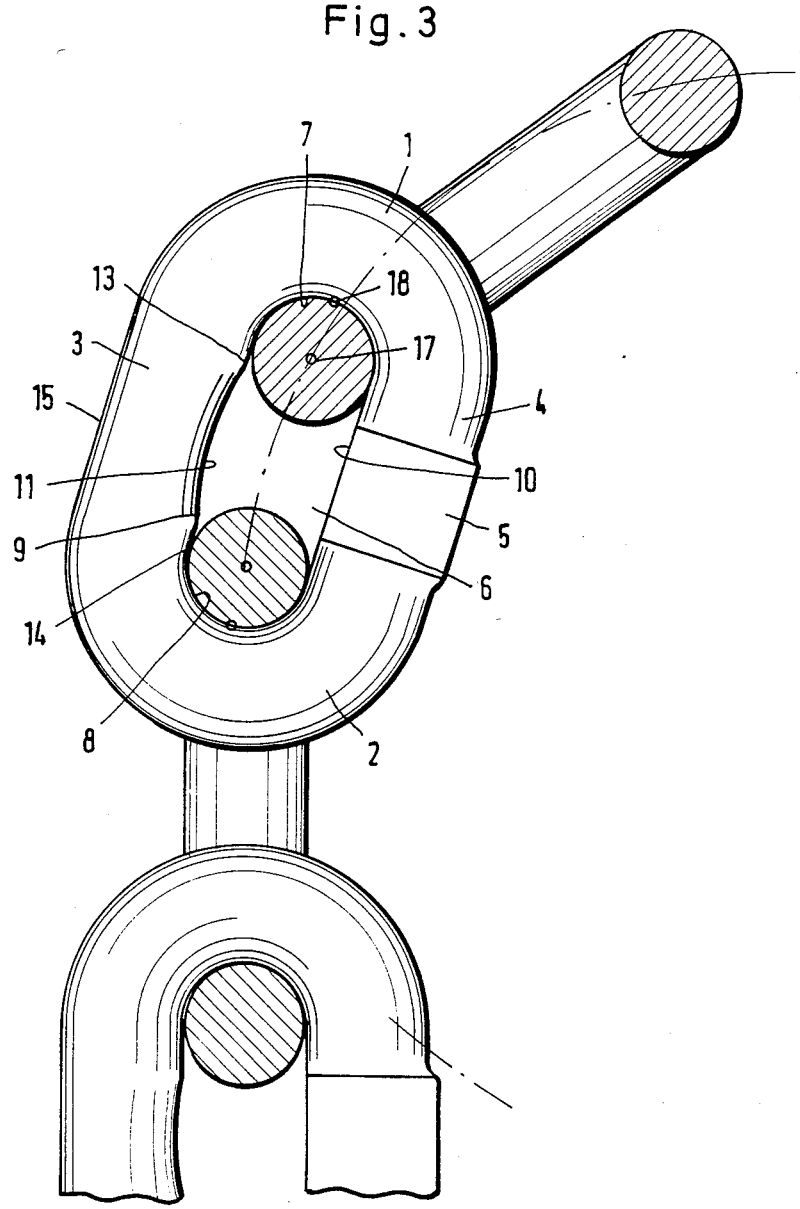
FIG. 3 shows the deflection of a chain on passing a chain wheel.

In FIG. 3, the position of successive chain links, when the chain runs around a chain wheel, is shown. As can be seen, neither the pivot point 17 of the chain links nor the joint vertex 18 are displaced when the chain links form an angle relative to one another. In other words, there is no migration of the joint vertex 18 along the supporting arc.

As already indicated at another point, the chain links described are particularly suitable for the manufacture of short-link chains for lifting-tackle, which have to meet stringent requirements with respect to stability of the shape and wear resistance. The selected form has the advantage that kinematically no joint displacements occur when running over chain wheels. The load-bearing pattern in the joints is extremely good, in particular if calibration of the chain links is carried out. The arcuate indentations ensure the mobility of the chain links relative to one another, which is required for operating lifting-tackle in the conventional manner.

We claim:

1. Chain with chain links of a welded round material, in particular round steel, in which noses of successive chain links have, in the region of contact points and viewed in a central link plane, supporting arcs with a radius of curvature $R_s$ which is virtually equal to half the diameter d of the round material, and in which the chain links have, at least at one point, an inner width $b_1$ of the size of at least 1.1 times the diameter d of the round material, said supporting arcs being joined together by two longitudinally oriented chain legs, said supporting arcs and said chain legs defining a closed clear inner space (6) therebetween, characterized in that the radius of curvature $R_s$ extends over a supporting arc angle α of 180°, at least a portion of one of said chain legs (3) defining an arcuate indentation adjacent to and directed away from said clear inner space (6), one of said chain legs being an unwelded leg (3) and one of said chain legs (4) being a welded leg, said arcuate indentation (11) being defined only on a portion of said unwelded leg (3), said unwelded leg (3) having, with a straight outer boundary line (15), in the central link plane a cross-section which is widened perpendicular to the central link plane, said welded leg (4) being straight.

2. Chain according to claim 1, characterized in that said arcuate indentation has the shape of a depression with a vertex region (12) at its center, said clear inner space (6) of the chain links having its greatest inner width $b_{1max}$ in the region of said vertex (12).

3. Chain according to claim 1 or 2, characterized in that the greatest inner width $b_{1max}$ of the chain links is at most equal to 1.15 times the diameter d of the round material.

4. Chain according to claim 1 or 2, characterized in that the size of the cross-sectional area of the legs (3) of the chain links in the region of said arcuate indentation is essentially equal to the size of the cross-sectional area of the chain links in the region of their noses (1,2).

5. Chain according to claim 2, characterized in that said portion of said chain leg defining said arcuate indentation (11) merges via straight boundary line sections (13,14) into the supporting arcs (7,8).

6. Chain according to claim 5, characterized in that each straight boundary line section (13,14) is of a length l approximately equal to 0.2 times the diameter d of the round material.

7. Chain according to claim 1 or 2, characterized in that the welded leg (4) has, in the region of a weld (5), a cross-section which is enlarged relative to the cross-section of the round material.

8. Chain according to claim 1 or 2, characterized in that the radius of curvature $R_s$ of the supporting arcs (7,8) is equal to 0.5–0.52 times the diameter d of the round material.

9. Chain according to claim 1 or 2, characterized in that said chain links have a pitch t which is at most, equal to 3 times the diameter d of the round material.

10. Chain according to claim 1 or 2, characterized in that the profile of said arcuate indentation (11) is circular and has a radius of curvature $R_A$ which is approximately 2.5 times that of the diameter d of the round material.

11. Chain according to claim 1 or 2, characterized in that said chain links have an outer width $b_2$ which is smaller than 3.2 times the diameter d of the round material.

12. Chain according to claim 1 wherein said arcuate indentation (11) is defined on said one leg (3) proximate to the center thereof.

* * * * *

UNITED STATES PATENT AND TRADEMARK OFFICE
CERTIFICATE OF CORRECTION

PATENT NO. : 4,571,934
DATED : February 25, 1986
INVENTOR(S) : Werner Rieger, et al It is certified that error appears in the above—identified patent and that said Letters Patent are hereby corrected as shown below:

Column 2, Line 53: Delete "The bulge" and substitute -- The arcuate indentation --.

Column 4, Line 3: After "indentation" insert --(11) --.

Signed and Sealed this

Third Day of June 1986

[SEAL]

Attest:

DONALD J. QUIGG

Attesting Officer

Commissioner of Patents and Trademarks